United States Patent Office 3,068,230
Patented Dec. 11, 1962

3,068,230
METHOD FOR REMOVING COLOR-FORMING BODIES FROM N-ALKYLMORPHOLINES
Justin F. Cooper, Austin, Tex., assignor to Jefferson Chemical Company, Inc., Houston, Tex., a corporation of Delaware
No Drawing. Filed Dec. 8, 1959, Ser. No. 858,032
7 Claims. (Cl. 260—247)

The present invention relates to N-alkyl morpholines and, in particular, to a method for improving the properties of N-alkyl morpholines as catalysts for the manufacture of polyurethane foams.

The invention is based on the discover that N-alkyl morpholines having color-forming bodies may be converted to commercially acceptable catalysts by distillation in the presence of a strong acid.

Polyurethane foams are a class of synthetic polymers that have considerable commercial value. These materials are prepared by reacting a polyester compound with a diisocyanate in the presence of a catalyst under suitable polymerization conditions. N-alkyl morpholines comprise a class of materials which have exhibited valuable properties as catalysts in the production of the above-noted polyurethane foams.

N-alkyl morpholines exhibiting catalytic activity in the above reaction may be prepared by reacting an alkylamine with a dichloroalkyl ether in the presence of a base. In a typical preparation, an alkylamine, such as methylamine, is charged into a reaction vessel containing a caustic solution with bis(2-chloroethyl) ether. The caustic is employed in a slight excess over the amount of hydrogen chloride released in the reaction. Thus, in a reaction between a mol of an alkylamine and a mol of bis(2-chloroethyl) ether, slightly over two mols of caustic are employed. The reaction is generally conducted at a moderately elevated temperature, preferably from about 80° C. up to about 150° C.

On completion of the foregoing reaction, the aqueous reaction product is distilled to effect the recovery of an N-alkyl morpholine-water azeotrope overhead. Depending upon the particular N-alkyl morpholine employed, the axeotropic solution will contain varying amounts of water, such as 25% to 50% or more. This solution may be dried by any convenient method to produce a crude, dried N-alkyl morpholine. However, it has been found preferable to dry the solution by extraction with a concentrated caustic solution and then to use this same caustic solution after the drying step as the base in the reaction leading to the formation of the N-alkyl morpholine. The crude, dried N-alkyl morpholine is then distilled in a final step to remove traces of water and to produce the finished N-alkyl morpholine.

N-alkyl morpholines produced by the foregoing process are highly effective as polymerization catalysts in the production of polyurethane foams. Their use in this process, however, has often resulted in the production of highly discolored foams. Since a relatively cream-white product is the norm for polyurethane foams, foams that have developed a discoloration are commercially unsatisfactory.

A study of this problem led to the discovery that dried and finished N-alkyl morpholines frequently contained color-forming bodies which on contact with water resulted in the production of deeply colored solutions generally of an orange-red hue. Attempts to remove these color-forming bodies by fractionation were unsuccessful. It was necessary, therefore, to develop a test to determine the suitability of the various N-alkyl morpholine products as catalysts for polyurethane foam manufacture. This test consists of mixing four parts by volume of an N-alkyl morpholine with six parts by volume of water and allowing the solution to stand for 24 hours. The appearance of color in the solution, i.e. a color having a Pt-Co value greater than 35 after standing indicated that the N-alkyl morpholine tested was unsatisfactory for polyurethane foam manufacture. Aqueous test solutions of N-alkyl morpholines that proved to be unsatisfactory frequently has Pt-Co color readings of 100 to 500 or more. Catalysts having a Pt-Co reading in the test solution of less than about 35 are considered to be substantially free of color-forming bodies. The Pt-Co (Platinum-Cobalt) color scale is a measure of color as determined from the standard Hazen platinum-cobalt solution prepared as described in "Standard Methods of Chemical Analyses" fifth edition, vol. 2, page 2048 by Scott.

A method has now been discovered whereby the color-forming bodies present in N-alkyl morpholines may be destroyed to produce a material that is uniformly satisfactory as a catalyst for the production of polyurethane foams.

In accordance with this method, an N-alkyl morpholine having color-forming bodies, which react in an aqueous medium to produce colored aqueous solutions, is treated with a strong acid, preferably concentrated, to render the material acidulous. The so-treated N-alkyl morpholine is then heated and subjected to distillation to effect the recovery of the N-alkyl morpholine overhead. While the nature of the reaction which takes place during the foregoing step is not known, it has been found that the acid-treated and distilled N-alkyl morpholine is free of color-forming bodies.

This process must be conducted in the presence of a relatively strong acid, i.e. an acid having an ionization constant greater than $1 \times 10^{-4}$. Acids which meet this requirement include the inorganic acids, such as hydrochloric, phosphoric and sulfuric acids, and organic acids, such as citric and fumaric acids. Inorganic acids, particularly hydrochloric, are preferred for this process.

The amount of acid employed in this process is important and should be from about 0.1% to about 5% by weight based on the weight of the N-alkyl morpholine. Amounts below about 0.1% are relatively ineffective while amounts in excess of 5% not only do not materially improve the process but tend to reduce the amount of product recovered. It is preferred to employ the acid in a concentrated form. The acid addition may be added directly to the dried and finished body of N-alkyl morpholine or it may be added to the dried, crude alkyl morpholine. In either case, distillation of the treated N-alkyl morpholine is essential to effect destruction of the color-forming bodies.

This process is effective to destroy color-forming bodies which are found in the lower N-alkyl morpholines having from 1–8 carbon atoms in the alkyl radical, such as, N-methylmorpholine, N-ethylmorpholine, N-propylmorpholine, N-butylmorpholine and the like.

The following examples illustrate the practice of this invention.

*Example I*

To 100 parts of a dried and finished N-methyl morpholine fraction, which contained color-forming bodies and produced a deep orange-red hue when mixed with water in accordance with the above-noted test to produce a solution having Pt-Co value of greater than 500 was added 1 percent by weight of concentrated hydrochloric acid. The mixture was heated and the N-methylmorpholine distilled overhead. The recovered N-methylmorpholine was subjected to the color test described above to determine the presence of color bodies. After a period of 24 hours, the test solution was essentially colorless, i.e. the solution had a Pt-Co color of less than 10 indicating that the color bodies has been completely destroyed by the acid treatment and distillation.

*Example II*

To a fraction of crude, dried N-methylmorpholine containing color-forming bodies, which produced a colored solution having a Pt-Co value of greater than 500 when tested for color, was added 1 percent by weight of concentrated hydrochloric acid. The mixture was heated and N-methylmorpholine distilled overhead. The recovered N-methylmorpholine was subjected to the color test to determine the presence of color bodies. After 24 hours, the test solution was colorless with a Pt-Co reading of less than 10 indicating that the color bodies has been destroyed. This example illustrates that the procedure for destroying the color bodies is effective when applied to a crude, dried N-methylmorpholine.

*Example III*

To 100 parts of a dried and finished N-ethylmorpholine, which contained color-forming bodies and produced a deep orange-red hue having a Pt-Co value substantially greater than 500 when tested for color, was added 1 percent by weight of concentrated hydrochloric acid. The mixture was heated and the N-ethylmorpholine distilled overhead. The recovered N-ethylmorpholine was subjected to the color test. After a period of 24 hours, the test solution was found to be essentially colorless with a Pt-Co color of less than 10. This indicated that the color bodies had been completely destroyed by the acid treatment and distillation procedure.

Sulfuric, phosphoric and citric acids have also been employed and found effective for destroying the color-forming bodies found in the N-alkylmorpholines. Hydrochloric acid, however, gave the best results and is preferred for this process.

Obviously, many modifications and variations of the invention, as hereinbefore set forth, may be made without departing from the spirit and scope thereof, and therefore only such limitations should be imposed as are indicated in the appended claims.

I claim:

1. In a process for producing an N-alkylmorpholine free of color-forming bodies, said N-alkylmorpholine having been prepared by the reaction of an alkylamine with a dichloroalkyl ether in the presence of a molar excess of caustic at a temperature within the range of about 80° to about 150° C., followed by distillation of the crude aqueous reaction product; the improvement which comprises adding to the crude N-alkylmorpholine product from about 0.1% to about 5% by weight, based on the N-alkylmorpholine, of an acid having an ionization constant greater than $1 \times 10^{-4}$ to provide an acidulous mixture and distilling said mixture to produce an N-alkylmorpholine distillate product free of color-forming impurities.

2. A method as in claim 1 wherein the N-alkylmorpholine is N-methylmorpholine.

3. A method as in claim 1 wherein the N-alkylmorpholine is N-ethylmorpholine.

4. A method as in claim 1 wherein the acid is sulfuric acid.

5. A method as in claim 1 wherein the acid is phosphoric acid.

6. A method as in claim 1 wherein the acid is hydrochloric acid and the N-alkylmorpholine is N-methylmorpholine.

7. A method as in claim 1 wherein the N-alkylmorpholine is N-ethylmorpholine and the acid is hydrochloric acid.

References Cited in the file of this patent

UNITED STATES PATENTS 2,412,209     Dickey et al.           Dec. 10, 1946

OTHER REFERENCES

Germany, Ser. No. B 37373 IVb/12p, printed Feb. 9, 1956 (Kl 12 p.)